United States Patent [19]

Leathers et al.

[11] Patent Number: 4,508,538

[45] Date of Patent: Apr. 2, 1985

[54] RECOVERY OF FUMED SIO$_2$

[75] Inventors: Joel F. M. Leathers; Donald W. Calvin, both of Midland, Mich.

[73] Assignee: The Dow Chemical Company, Midland, Mich.

[21] Appl. No.: 212,762

[22] Filed: Dec. 4, 1980

Related U.S. Application Data

[63] Continuation-in-part of Ser. No. 761,558, Jan. 24, 1977, abandoned.

[51] Int. Cl.$^3$ ............................................. C01B 33/12
[52] U.S. Cl. .................................. 23/313 R; 423/336; 423/337
[58] Field of Search ............. 23/313, 293 A; 423/336, 423/337

[56] References Cited

U.S. PATENT DOCUMENTS

| | | | |
|---|---|---|---|
| 3,043,660 | 7/1962 | Hughes | 423/337 |
| 3,233,969 | 2/1966 | Heller | 423/336 |
| 3,269,799 | 8/1966 | Guma | 423/336 |
| 3,284,167 | 11/1966 | Heller | 423/336 |
| 3,645,684 | 2/1972 | De Cuir | 423/336 |

Primary Examiner—Hiram H. Bernstein
Attorney, Agent, or Firm—W. J. Lee

[57] ABSTRACT

A method of recovering fumed hydrophobic SiO$_2$, produced by the flame hydrolysis of a ternary azeotrope of H$_2$SiF$_6$, HF, and H$_2$O, is disclosed. The method involves passing the fumed hydrophobic silica, as it leaves the combustion chamber, through a nonclassifying agglomerator at a residence (travel) time of from about 0.5 to several seconds, preferably about 1.0 to about 5.0 seconds, then separating the fumed silica from the product stream in a cyclone separator or other means for collecting dispersoids.

10 Claims, 1 Drawing Figure

RECOVERY OF FUMED SIO₂

CROSS-REFERENCE TO RELATED APPLICATION

This is a continuation-in-part of copending application Ser. No. 761,558, filed Jan. 24, 1977 now abandoned.

BACKGROUND OF THE INVENTION

In processes wherein silicon fluoride compounds are burned or pyrolyzed in the flame of a combustible mixture of fuel and oxygen, hydrophobic $SiO_2$ is formed which is ultrafine and which is normally difficult, if not impossible, to efficiently separate from the hot, gaseous product stream in conventional methods, such as cyclones or filters. This ultra-fine silica is known as "fumed silica". Some of the $SiO_2$ may be separated by such conventional methods but uneconomical amounts of the ultra-fine $SiO_2$ pass through the collection devices. Some degree of recovery of the $SiO_2$ is possible using electrostatic precipitators, but the product which is recovered by the electrostatic precipitators is often of irregular particle size due to inconsistent agglomeration on the collection surfaces of the precipitators and due to the fact that some classification can occur by way of having some particles held up briefly while others go through virtually unchecked. Often some of the $SiO_2$ is recovered as a coarse material with a particle size approaching that of sand and thus has no appreciable value, if any, as a marketable product.

The production and collection of fumed hydrophobic silica formed by flame hydrolysis of silicon fluoride compounds should not be equated with the formation of fumed, hydrophilic silica formed by flame hydrolysis of silicon chloride compounds; such hydrophilic silica does not present the same agglomeration problems as hydrophobic silica.

It is well recognized that fumed $SiO_2$ has appreciable market value, but $SiO_2$ of coarse or grainy particle size approaching that of sand has little or no market value.

Representative patents for the formation of fumed hydrophobic $SiO_2$ are, for example, U.S. Pat. Nos. 2,819,151; 3,203,759; 3,110,562; 3,645,684; 3,233,969; 3,284,167; and others. The difficulty of efficiently collecting the fumed $SiO_2$ without appreciable loss of the $SiO_2$ by way of chemical reaction with other components of the gas stream or by over-agglomeration or inconsistent agglomeration are problems which confront persons attempting to manufacture fumed hydrophobic $SiO_2$.

In our U.S. Pat. No. 4,008,130, there is taught a method for preparing a ternary azeotrope containing about 36% $H_2SiF_6$, about 10% HF, and about 54% $H_2O$. It is also taught that the azeotrope may be burned in a combustion chamber to produce fumed hydrophobic $SiO_2$. When the ternary azeotrope, which is predominantly water, is burned to produce $SiO_2$, the concentration of $SiO_2$ carried in the hot gases leaving the burner is quite low, generally at a concentration of less than about 1.5%. It is difficult to recover a high percent of the $SiO_2$ when the concentration of $SiO_2$ in the gases is so low.

As compared to prior processes where $SiF_4$ is fed to the burner to produce fumed $SiO_2$, the use of an azeotrope feed, as in the present invention, results in a product stream which is relatively low in $SiO_2$ content and the difficulty of recovering an appreciable percentage of the $SiO_2$ in agglomerated, non-fused form is greatly magnified.

There exists, then, a need for methods of recovering fumed hydrophobic $SiO_2$ which will agglomerate such low-loadings of ultra-fine silica, consistently and on a continuous basis, to an extent which renders it substantially collectable in cyclones or other dispersoid-collecting devices, but which does not cause substantially unequal residence times of some of the particles prior to being removed from the product stream. Unequal residence times can cause some of the high surface area fumed silica to fuse into relatively low surface area grainy particles.

It is an object of the present invention to provide a method for separating substantial amounts of fumed hydrophobic silica from the hot gaseous product stream leaving the combustion chamber of a burner in which an azeotrope of $H_2SiF_6$, HF, and $H_2O$ is burned to produce ultra-fine hydrophobic $SiO_2$.

It is a further object to provide a method for continuously separating fumed, hydrophobic $SiO_2$, present as a low-concentration dispersoid in a hot gaseous stream, by agglomerating the $SiO_2$ to a particle size which is substantially constant but which is still characterized as a fumed, hydrophobic, high-surface area $SiO_2$.

These and further objects will become apparent to practitioners of the relevant arts upon reading this disclosure.

SUMMARY OF THE INVENTION

It has now been found that ultra-fine, fumed, hydrophobic silica, entrained as a low-concentration dispersoid in the hot gaseous product stream leaving the combustion chamber of a burner in which a ternary azeotrope of $H_2SiF_6$, HF, and $H_2O$ is pyrolyzed to produce the fumed hydrophobic $SiO_2$, can be efficiently collected as a fumed hydrophobic $SiO_2$ having substantially constant quality in dispersoid-collecting devices by causing the product stream from the combustion chamber to flow directly and continuously through a non-classifying agglomerator at a residence (travel) time of about 0.5 to several seconds, preferably about 1.0 to about 5.0 seconds, before reaching the dispersoid-collecting device. Conveniently, and preferably, the dispersoid-collecting device consists of one or more, preferably a series, of continuously operated cyclone separators.

DETAILED DESCRIPTION OF THE INVENTION

Figure 1:
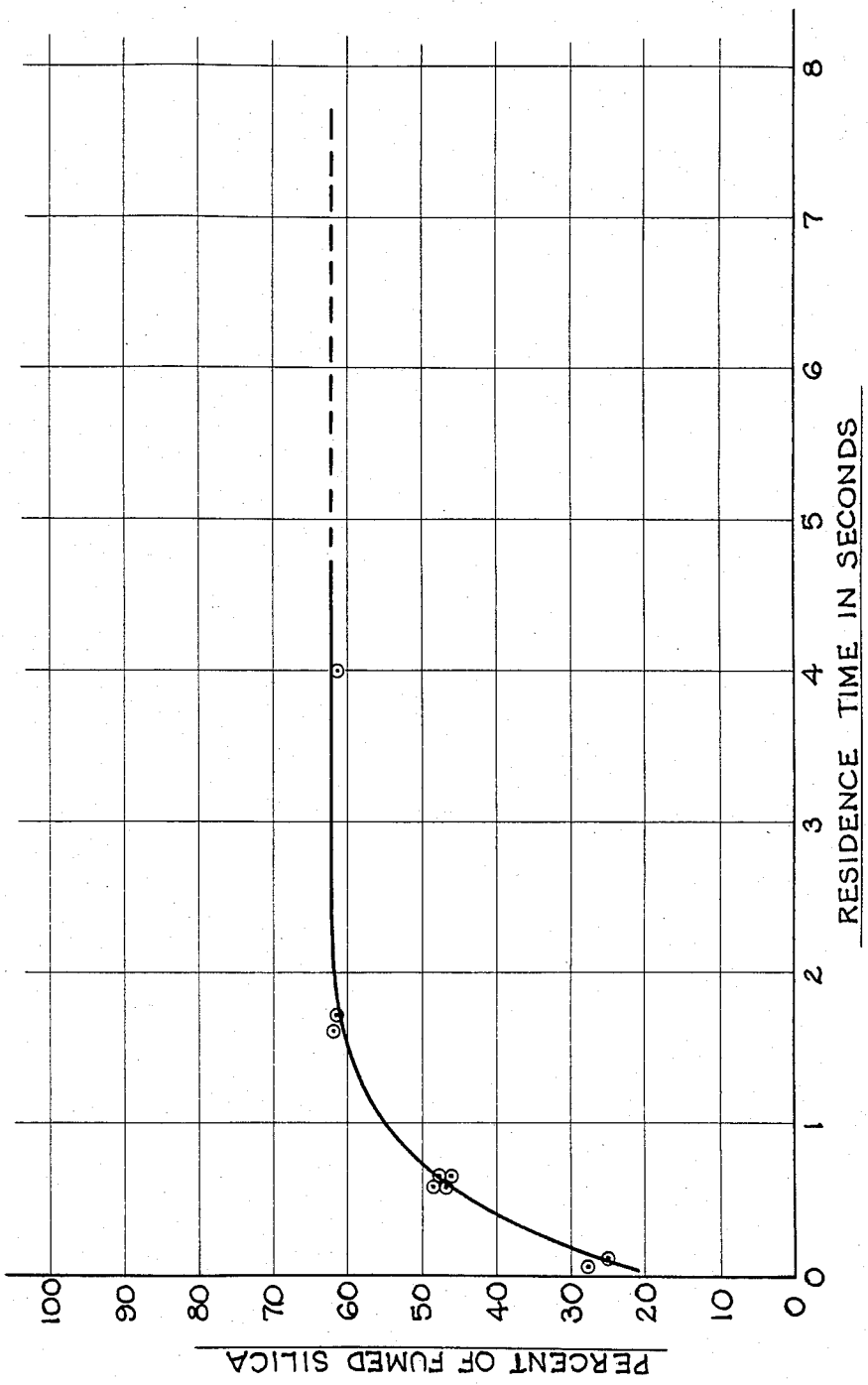

A ternary azeotrope containing about 36% $H_2SiF_6$, about 10% HF, and about 54% $H_2O$ is fed continuously into the combustion chamber of a flame pyrolyzer in which a fuel/oxygen mixture is continuously burned. The fuel is preferably hydrogen and the oxygen is preferably supplied as air such as is taught, e.g., in U.S. Pat. No. 2,819,151. The hot gaseous product stream (generally about 500° C. to about 800° C.) leaving the burner carries entrained ultra-fine, fumed, hydrophobic $SiO_2$ (sometimes called "silica smoke") in small concentration of less than about 1.5% by wt. The product stream leaves the burner and passes directly to a non-classifying agglomerator which is designed to provide a residence (travel) time of the stream of from about 0.5 to several seconds. Less than about 0.5 seconds is generally unsuitable in that little or no agglomeration occurs and more than several seconds does not significantly improve the percent of SiO$_2$ separated by the dispersoid-collecting device and can, in fact, create agglomerated particles which are fused together rather than clustered together and therefore are larger or more dense than is desired in a good quality of fumed SiO$_2$. Clustered particles have appreciably greater surface area per volume and per weight and are more desirable than fused particles which have diminished surface area. Preferably the residence (travel) time is about 1.0 to about 5.0 seconds for obtaining a highly efficient separation in the dispersoid-collecting device while avoiding formation of an unacceptable amount of larger particles. Most preferably, a residence time of about 1.5 to about 4.0 seconds is employed. The agglomerator must be of a non-classifying type which will not, itself, separate the SiO$_2$ from the stream or substantially restrain it from flowing as a dispersoid as this would cause the residence time of the SiO$_2$ in the agglomerator to exceed the desired range.

As used herein, the expression "several seconds" is used to denote a residence (travel) time of not much greater than about 5.0 seconds. It should be understood that greater residence (travel) times may assure essentially complete collisions of all the particles, but at the same time such greater residence (travel) times also provide greater opportunity for the clustered particles to form fused particles and also provide greater opportunity for back-reaction between the SiO$_2$ and HF. Since the effect one gets in the agglomerator at greater residence times is largely dependent on the concentration, temperature, and on other factors, such as the amount of turbulence and the amount of classification, the "trade-off" indicates that a residence time of not much over about 5 seconds should be the maximum time used.

Agglomerators useful in the present invention may be conduits in the shape of a spiral or coil or may be a conduit having several hair-pin curves or several bends. The agglomerator should be one which provides enough turbulent flow of the product stream to provide for collision of particles, yet should not be a path so tortuous that the agglomerated particles are substantially restrained from flowing along with the nonagglomerated particles, thereby in effect causing a classification of particles. Though the agglomerator may be constructed in a manner to cause the product stream to flow upwardly or partly upwardly, it is preferable that all the flow of product, stream be horizontal and/or downwardly in order that classification of particles be avoided and to avoid any residence (travel) time of particles greater than the desired maximum of several seconds. Essentially, the flow of the product gases and entrained-solids is in "plug-flow" manner.

A particularly effective and economical agglomerator for large scale use consists of several lengths of conduits connected sequentially in head-to-foot fashion by U-bends, or U-joints, all being positioned horizontally. The product stream flows through the first section, back through the second section, then through the third section and so on with the turbulence supplied by the U-bends being sufficient to aid the agglomeration yet not sufficient to break up the clusters that are formed and not substantially holding-up or restraining the particles.

The size and length of the agglomerator will depend on the rate and volume of product stream to be handled. When this is known it is within the skill of the practitioner to select the agglomerator size to provide the desired residence time.

As used herein, the expression "an agglomerator" is not necessarily limited to a single apparatus, but is also meant to include the use of more than one agglomerator where the hot product stream leaving the combustion chamber is split into two or more streams before going through the agglomeration step.

The product stream, after leaving the agglomerator, is passed through a dispersoid-collecting device where the fumed, hydrophobic silica is separated from the product stream. A series of cyclone separators has been found to be particularly effective. Other less-preferred collecting devices, such as filter-bags or electrostatic accumulators, may be used, the use of these being known to practitioners of the relevant arts.

The product stream which passes through the dispersoid-collecting device normally contains H$_2$O vapor, HF, any unseparated silica smoke, and other products of combustion and any residual silicon fluoride compound. It is generally convenient and economical to recycle, back to the burner, the uncollected silicon values and fluoride values, along with whatever necessary make-up values which may be required. For instance the re-cycles SiO$_2$ values can be reacted with the HF values to give SiF$_4$ and H$_2$O. Furthermore, the SiF$_4$ can be reacted with HF to give H$_2$SiF$_6$, in a ternary azeotrope which can be pyrolyzed in the presence of H$_2$O vapors in a flame to give fumed SiO$_2$.

By operating according to the present invention, where the agglomeration and separation of the fumed SiO$_2$ is done without any undesired hold-up of the fumed SiO$_2$, two major problems are solved: One problem solved is that excess agglomeration (i.e., formation of fused SiO$_2$ particles larger than the desired clustered "fumed" SiO$_2$) is avoided and a fumed silica of significant market value is obtained. Another problem solved is that the agglomeration and separation of the fumed SiO$_2$ is done quickly and efficiently before there is enough cooling of the hot gaseous stream to reach the dew point of any of the vaporous components, thereby substantially avoiding corrosion problems and loss of SiO$_2$ values without having to supply more heat along the way to keep the temperature above the dew point. The temperature of the product stream may reach as low as about 95° C. without encountering condensation in the agglomerator, but it is best to keep the temperature of the product stream in the agglomerator above about 150° C., preferably above about 200° C. in order to avoid reaching the dew point in the separators.

The present invention is illustrated by the following examples but is not limited to the embodiments shown therein, the invention being limited only by the claims.

FIG. 1 is a graph depicting the effect of residence time in the agglomerator on the percent of fumed SiO$_2$ recovered in the present process. The percentages are based on 100% conversion of silicon fluoride values to SiO$_2$.

EXAMPLE 1

An aqueous azeotropic solution of H$_2$SiF$_6$, containing about 34.6% H$_2$SiF$_6$ and about 10.7% HG was burned in the flame of a combustible mixture of hydrogen and excess air. The product stream from the flame hydrolysis was at a temperature of about 600° C.-700° C. as it left the burner and was passed directly through an agglomerator (in this case, a coiled conduit) with a residence (travel) time of about 1.7 seconds. The stream was at a temperature of about 400°–450° C. leaving the agglomerator and the fumed SiO$_2$ was separated from the stream by a series of three cyclone separators. The fumed SiO$_2$ was hydrophobic and had a nominal pour density of about 1.00 lb/ft$^3$. The recovery efficiency of the fumed SiO$_2$ was 61%.

EXAMPLE 2

In other runs made substantially in accordance with the method of claim 1, the residence (travel) time was varied, by using different lengths of coiled conduit, in order to determine the effect. The results are shown in the following Table 1. Run No. 1 is a control in which no agglomerator was used.

TABLE 1

| Run No. | Seconds of Residence Time | % of fumed SiO$_2$ separated by the cyclones |
| --- | --- | --- |
| 1 | 0 | trace |
| 2 | 0.125 | 26.7 |
| 3 | .122 | 28.2 |
| 4 | .671 | 46.2 |
| 5 | .671 | 47.6 |
| 6 | .655 | 46.9 |
| 7 | .637 | 48.4 |
| 8 | 1.78 | 54.4 |
| 9 | 1.68 | 61.2 |

Photomicrographs show that the agglomerates or "clusters" are not particles substantially fused together thereby suffering loss of surface area, but are clusters which are tangentially joined and retain nearly all the original surface area.

EXAMPLE 3

Fumed hydrophobic silica is produced similarly to Examples 1 and 2 above by burning a combustible mixture of H$_2$ and air along with a ternary azeotrope mixture of about 36% H$_2$SiF$_6$, about 11% HF, and about 53% H$_2$O in a combustion chamber, passing the combustion product stream through an agglomerator and then separating the SiO$_2$ from the combustion product stream in a cyclone separator. The duration of the run was about 9.5 hours. Feed streams to the burner were: 29.9 SCFM of H$_2$; 93.5 SCFM of air (mixed with the H$_2$); 220.0 SCFM of air to provide flow of the combustion products; and ternary azeotrope at an average rate of about 1.9 lbs/min. The combustion product stream, containing about 1.04% fumed SiO$_2$, was passed immediately through a horizontally-disposed serpentine agglomerator about 8 inches in diameter and about 120 feet long. The temperature of the combustion product stream leaving the burner and entering the agglomerator was about 760° C. and was about 204° C. leaving the agglomerator. Residence (travel) time in the agglomerator was about 4 seconds. About 98.2 lbs. of fumed SiO$_2$ having a surface area of about 211 square meters/gram was recovered; this represents an overall efficiency of about 61.0%.

We claim:

1. A method for collecting fumed hydrophobic silica formed in a combustion chamber by the flame hydrolysis of a ternary azeotrope comprising about 36% H$_2$SiF$_6$, about 10% HF and about 54% H$_2$O in which the hot product stream leaving the combustion chamber carries the fumed hydrophobic silica as an ultra-fine dispersoid at a concentration of less than about 1.5% by weight, the said method comprising, passing the hot product stream immediately after it leaves the combustion chamber through a non-classifying agglomerator for a travel time in the agglomerator of from about 1.5 to about 4.0 seconds during which travel time the temperature of the product stream drops to not less than about 150° C., and collecting the agglomerated, fumed, hydrophobic silica in a dispersoid-collecting device while allowing the remainder of the product stream to flow through.

2. The method of claim 1 in which the agglomerator comprises a plurality of sections of conduits joined sequentially in head-to-foot fashion by U-joints or U-bends, all lying horizontally.

3. The method of claim 1 in which the agglomerator comprises a spiral conduit.

4. The method of claim 1 in which the agglomerator is a coiled conduit.

5. The method of claim 1 in which the agglomerator is positioned in a manner to allow flow of the hot product stream horizontally and/or downwardly.

6. The method of claim 1 in which the dispersoid-collecting device comprises at least one cyclone separator connected in series with the agglomerator.

7. The method of claim 1 in which the dispersoid-collecting device comprises a filter means.

8. The method of claim 1 in which the dispersoid-collecting device comprises a plurality of cyclone separators connected in series.

9. The method of claim 1 in which the hot product stream is generated in continuous manner, and the product stream is passed through the agglomerator and the dispersoid-collecting device in continuous manner.

10. The method of claim 1 in which silicon values and fluorine values which remain in the product stream after passing through the dispersoid-collecting device are re-cycled, along with any requied make-up values, to the feed stream which feeds the burner for the making of fumed SiO$_2$.

* * * * *

UNITED STATES PATENT AND TRADEMARK OFFICE
CERTIFICATE OF CORRECTION

PATENT NO. : 4,508,538
DATED : April 2, 1985
INVENTOR(S) : Joel F. M. Leathers and Donald W. Calvin It is certified that error appears in the above-identified patent and that said Letters Patent is hereby corrected as shown below:

Column 3, line 62 reads "agglomeration"; should read --agglomeration,--.

Column 4, line 25 reads "re-cycles"; should read --re-cycled--.

Column 4, line 63 reads "HG"; should read --HF--.

Column 6, line 51 reads "requied"; should read --required--.

Signed and Sealed this

Seventeenth Day of September 1985

[SEAL]

Attest:

Attesting Officer

DONALD J. QUIGG

Commissioner of Patents and Trademarks—Designate